United States Patent Office 3,429,683
Patented Feb. 25, 1969

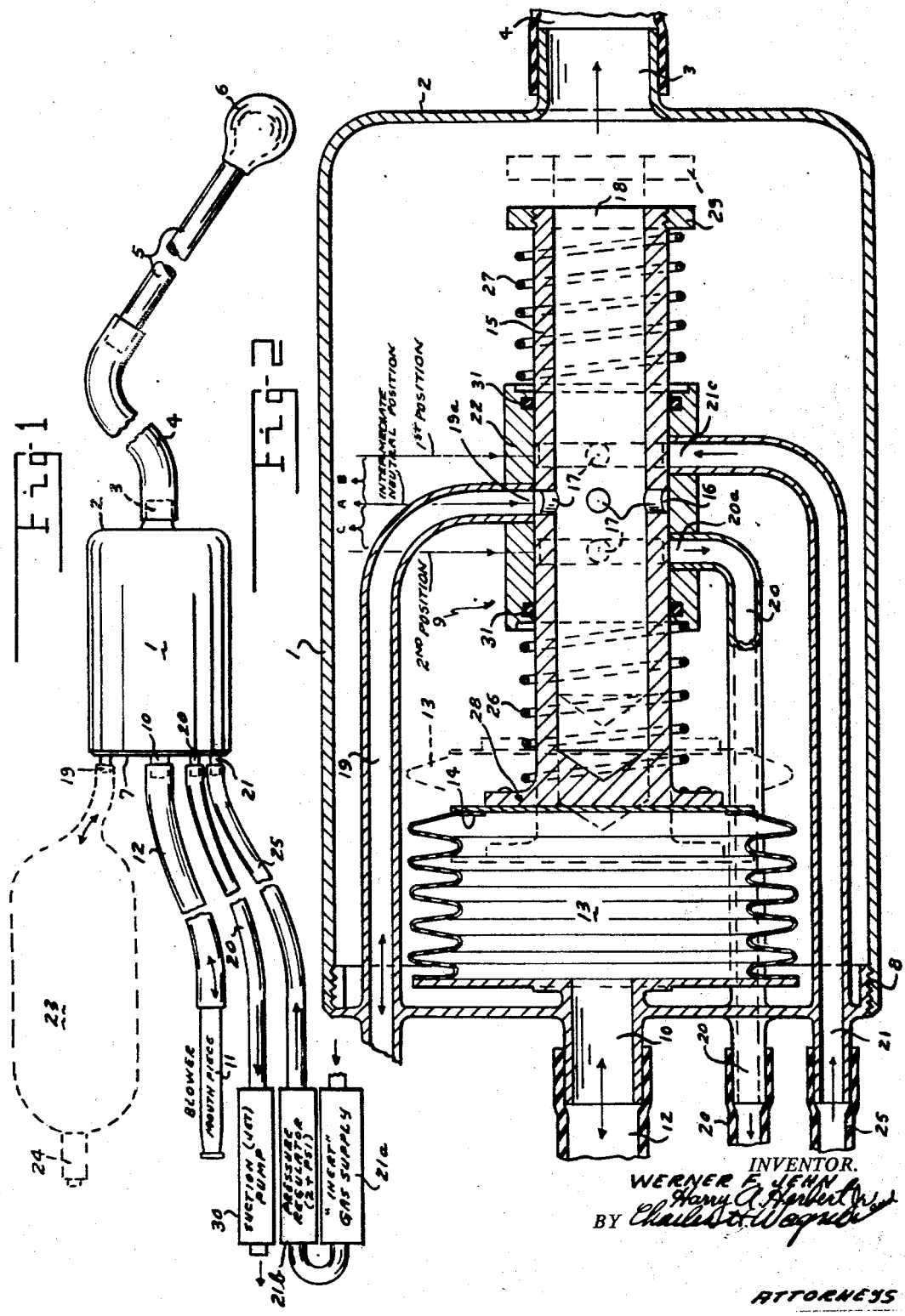

3,429,683
ORAL CONTROLLED PRESSURE REGULATOR
FOR BLOWING GLASS
Werner F. Jehn, 438 Twinning Drive,
Dayton, Ohio 45431
Filed Mar. 21, 1966, Ser. No. 537,616
U.S. Cl. 65—301                                    6 Claims
Int. Cl. C03b 9/02

ABSTRACT OF THE DISCLOSURE

The present invention relates to a pressure regulator adapted for connection to a glass blowing device for blowing glass articles, including a leak proof chamber wherein an axially extensible bellows is connected at one end to the chamber through an oral suction-pressure supply port and at the other end is connected to a tubular slide valve which terminates in an opening into the chamber and wherein said slide valve contains ports for communication with an exterior air conduit, a suction pressure supply conduit, and a positive pressure supply conduit which operates to control blowing of the glass article connected to the chamber near the termination opening of said tubular slide valve.

---

The invention described herein may be manufactured and used by or for the United States Government for governmental purposes without the payment to me of any royalty thereon.

This invention relates to pressure regulators and more particularly to gas pressure regulators for blowing glass articles and equipment having for an object the provision of means for utilizing the glassblower's oral breath pressure to control a separate gas under pressure to provide the actual glassblowing pressure.

The manufacture of glass articles using the usual glassblower's apparatus and his oral breath and pressure to form the articles has often been found to be unsatisfactory and undesirable. Moisture collects on the cooler portions of the apparatus and the condensed moisture or water vapor droplets run down on the hot portions of the glass article being blown to often cause cracking of the glass.

Metals like Kovar and molybdenum oxidize in the moist atmosphere in usual or conventional oral glass-blowing apparatus in the presence of heat and the oxide layer will have to be eliminated by thorough cleaning after completion of the blown glasswork. Also the emissive coatings on oxide cathodes which are often incorporated in blown glass technical apparatus can be damaged or destroyed by moisture and heat during the glassblowing operation.

In order to eliminate or reduce these hazards or drawbacks at least two methods have been used or tried. One method involves passing the glassblower's breath through a suitable filter before it reaches the molten glass blob or bubble to be blown. While another method comprises replacing the glassblower's breath with an inert gas under pressure which is controlled manually by a foot or hand operated valve mechanism.

The filter usually eliminates most of the moisture but does not eliminate the undesirable oxygen in the glassblower's breath. In addition, the filter increases the resistance in the air flow of the glassblower's breath into the article being blown, and therefore deprives the glassblower of some of his "sense of feeling" during the glassblowing operation.

When a foot or manually operated control valve is used with gas under pressure in the glassblowing operation, for instance an inert gas, the contamination is, of course, eliminated, but the glassblower loses the desired "sense of feeling" or precise control which is normally present where the blower uses his breath to form a glass article or apparatus from the molten glass which is so essential in blowing complex and precision laboratory apparatus to produce a good precision job.

An object of the invention is the provision of a simple, sensitive, and rugged valve structure for blowing glass articles in which an inert gas under pressure is employed which is controlled by the glassblower's breath pressure to simulate as closely as possible the normal or conventional oral glassblower's working conditions by utilizing his oral pressure or breath to accurately control the blowing while keeping his breath completely out of the apparatus or glass being blown or manufactured.

Another object of the invention is the provision of a glassblowing apparatus which includes a super-sensitive oral pressure controlled valve member which is selectively controlled by the glassblower's breath or suction pressure to selectively control the passage and pressure of an inert gas into, or selective withdrawal of the inert gas from, the glass blown article during the blowing thereof in predetermined pressure ratio to the glassblower's breath pressure or his suction.

A still further object is the provision of a valve for controlling a glassblowing pressure which is responsive to the glassblower's breath pressure which facilitates a glassblower's work in the blowing or manufacture of very large glass blown articles.

A further object of the invention is the provision of glassblowing apparatus which includes valve means operated by the glassblower's breath to control the flow of an inert or reducing gas in proportion to the glassblower's breath or oral pressure to simulate as near as possible the normal working conditions of the glassblower while at the same time keeping his breath completely out of the apparatus or device being blown to protect the glassblower from harmful radioactive vapors or gases evolved from the heated surfaces inside of the glass blown apparatus being fabricated by the glassblower.

A further object is the provision of a simple valve structure in which the pressure and flow of an inert or reducing gas is controlled by the pressure of the glassblower's breath while preventing contamination of the glass blown apparatus by the glassblower's breath to prevent metal parts inside of the blown apparatus from being oxidized by the glassblower's breath, also facilitating the glassblower's work with larger apparatus while protecting the glassblower from harmful vapors evolved from the heated surfaces of the apparatus, especially in the development and fabrication of electronic devices, both high vacuum and gas filled, where extreme cleanliness is essential, for instance such as gas lasers.

Another object is the provision of an oral glassblowing device including a control valve operated by the glassblower's breath pressure for selectively supplying a separate positive gas flow or separate negative suction pressure to or from the glass apparatus being blown which is separate and independent of the glassblower's breath or his suction but in a predetermined positive or suction pressure ratio thereto.

Other objects and advantages of the invention will become apparent from the following description and accompanying drawings in which like reference characters refer to like parts in the several figures.

FIGURE 1 is a somewhat diagrammatic elevation view, parts being broken away to foreshorten, illustrating a glassblowing apparatus incorporating the invention, dotted lines therein illustrating a plastic bag container which is employed with an inert gas when employed to supply the variable controlling inflation and suction pressures during the glassblowing operation under the glassblower's breath control.

FIGURE 2 is an enlarged longitudinal sectional view taken through the control valve structure of the invention shown in FIGURE 1.

Referring to the drawings, and more particularly to FIG. 1, the reference numeral 1 denotes a leakproof valve chamber having a front end 2 formed with a central outlet opening or nozzle 3 which is preferably connected by a flexible conduit or hose 4 to the glassblower's tube or work piece 5, the end of which is dipped in the molten glass batch to gather the blob or bubble of glass 6 which is to be blown or worked to form or fabricate the desired glass blown article or apparatus, the drawing showing the bubble 6 at the start of the glassblowing operation. The glassblower's work piece or tube 5 as shown is flexibly connected by the hose 4 to provide easier manipulation of the bubble 6 during the blowing and manipulating operation although the tube 5 could extend rigidly out from the outlet opening 3, if desired.

The opposite or rear end of the valve chamber 1 is closed by a closure valve supporting plate 7 which is preferably removably sealed in the rear end of the chamber 1 proper, by any suitable means for instance at 8, and forms a support for the internal valve structure 9.

The supporting plate 7 has a central blower inlet (and suction) conduit 10 which is connected to a glassblower's mouthpiece 11 (as seen in FIG. 1) preferably by a flexible hose 12 while the other end of the central conduit 10 extends into the interior of the chamber 1 and carries a very soft and flexible bellows 13 member fixed thereon which is extensible and contractible longitudinally in the chamber 1 (as shown in dotted lines in FIG. 2) by the pressure differential in the chamber 1 between the pressure surrounding the bellows and the glassblower's breath pressure introduced into the bellows 13 through the inlet 10, or withdrawn from within the bellows by the glassblower.

The other or forward end 14 of the bellows 13 is closed by a plate and has concentrically fixed thereto an elongated hollow axially slidable tubular valve member 15 which opens at its outer end 18 into the chamber 1.

This shiftable hollow slide valve member 15 is formed with an annular groove or channel 16 substantially midway between its ends having a plurality of ports 17 opening inwardly from the groove 16 into the hollow bore 18 in the slide valve member. The valve structure supporting closure plate 7 has three ports or conduits extending therethrough, indicated at 19, 20 and 21 which extend forwardly into the chamber 1 to support a fixed tubular valve sleeve 22 which surrounds and slidably supports the elongated slide valve member 15 in close sliding relation.

The conduit 19 connects with a valve port 19a which normally registers with the annular groove 16 and ports 17 when the slide valve 15 is in a neutral or balanced position, indicated at A and shown in full lines. The outer or rear end of the conduit 19 is open to atmosphere or into a plastic bag 23 having a low pressure relief port 24 which is used when variable pressure or suction is supplied by the glassblower through the glassblower's mouthpiece 11 and an inert gas is employed to effect the actual glassblowing.

The slide valve 15 is provided with two opposing equalizing shifter coil springs 26 and 27 which surround the valve 15 and are disposed respectively between the rear flanged end 28 of the valve 15 and the rear end of the valve sleeve 22, and between the collar 29 on the front end of the valve 15 and the front end of the sleeve 22. When pressures inside and outside of the bellows 13 are equal the two springs 26 and 27 shift the slide valve 15 to neutral position to dispose the ports 17 and groove 16 in register with the conduit 19 to admit atmosphere, or inert gas from the plastic bag 23, into the chamber 1 through the bore 18 in the valve 15 or permit the gas to escape to normalize the air or gas to atmospheric pressure in the conduits 3, 4 and 5, and in the glass bubble or article 6 being blown.

The conduit 21 connects with a separate gaseous pressure source 21a, which may be an inert or reducing gas such as argon, nitrogen or a mixture of hydrogen and nitrogen at a low pressure controlled through a suitable pressure regulator 21b set at a few p.s.i. pressure.

The other or forward end of the conduit 21 connects with a port 21c in the fixed valve sleeve 22 which port is spaced forwardly from the port 19a preferably about the width of the groove 16 so that as the sleeve valve 15 moves forwardly by expansion of the bellows 13 a distance B the separate gas or inert pressure medium is admitted through the ports 21c and 17 into the chamber 1 to increase pressure in the chamber 1 and to cause flow of the pressure medium into the hose 4 to effect the glassblowing function through the glassblower's manipulating the tube 5 into the glass bubble 6 to increase the size (or length) thereof during manipulation of the tube 5, under selective control of the glassblower's breath and pressure at the mouthpiece 11.

The conduit 20 is a suction conduit having its inner end, in the chamber 1, opening into communication with a port 20a in the side of the valve sleeve 22, and equally spaced at the opposite side of the port 19a from the port 21c at a distance indicated at C about equal to the width of groove 16. The opposite or outer end of the conduit 20 is preferably connected through a flexible hose 25 to a suction source or suction pump 30, such as a water jet pump.

From the above it will be observed that when no pressure or suction is applied by the glassblower in conduit 10 the pressure inside and outside of the bellows 13 is quickly balanced and the springs 26 and 27 move the tubular slide valve 15 to its central position A with the ports 17 open through the conduit 19 to atmosphere, thus venting the workpiece tube 5 and the interior of the glass article 6 being blown to atmosphere or to the contents of the flexible plastic bag 23.

When the glassblower blows into the mouthpiece 11 the bellows 13 is extended axially to move the sleeve valve member 15 to the right (as shown in dotted lines) to close the atmosphere inlet port 19a and open, or partly open, the inert gas inlet port 21c to admit the inert gas through the bore 18 in the valve member into the chamber 1 to balance the bellows 13 in its new position and cause the flow of the inert gas through conduit 4 and tube 5 to enter and further expand the glass bubble or material 6 as desired, compressing the spring 27. Gas will then flow to expand the glass bubble 6 as desired.

Since the bellows 13 is closed to the interior of the chamber 1 there can be no contamination of the blowing gas with the glassblower's breath, and should, as is sometimes the case, the glassblower desire to reduce the size of certain portions of the glass article being blown the glassblower can suck in on the mouthpiece 11 by simply withdrawing his breath pressure to lower the pressure in the bellows 13 relative to the exterior pressure on the bellows in the chamber 1, causing the bellows to contract and shift the sleeve valve 15 to the left to cut off the inert gas outlet 21c and open the suction inlet 20a to establish communication through conduit 20 with the suction pump 30 as the slide valve is moved to or toward the position C. Thus the glassblower cannot suck in any of the inert gas or dangerous fumes which may be withdrawn from the blown glass article or bubble 6.

If no pressure or suction is applied to the tube mouthpiece 11 by the glassblower, the bellows 13 and slide valve member 15 will move to, or be in, their initial or neutral position A and the pressure in the chamber 1 and in the bubble or article 6 being blown will be equal to the pressure of the outside air or gas in the bag 23, if used. If the glassblower wants to expand the bubble 6, he blows into his mouthpiece 11 with the same pressure he would use in normal practice; however, very large glass articles can be blown without the expenditure of much of the glassblower's breath or energy since the pressure of his breath only is employed, not the volume.

If the glassblower wants to reduce the pressure in the bubble 6, he releases air from the mouthpiece 11 in the usual way and since the pressure in the chamber 1 is greater than the pressure in the bellows 13 the bellows will be contracted and gas from the chamber 1 will escape through the ports 17, 19a and conduit 19; and the slide valve will be held in this neutral position by the springs 26 and 27. Thus, the pressure in the chamber 1 and also in the bubble 6 will always duplicate the pressure inside of the bellows and this applies also for reduced pressure when the glassblower sucks in on his mouthpiece 11.

When the device is used with the inert gas and the suction pump 30, the conduit 19 is not left open to atmosphere but employs the flexible plastic bag 23 previously referred to which is provided with the pressure relief valve opening 24 and is filled, or partly filled, with an inert gas. The apparatus prior to use must be flushed out with an inert gas before the glassblowing is commenced.

From the above it will be observed that the operation of the device depends entirely upon the glassblower's breath pressure as in the conventional glassblower's pipe, and therefore leaves the glassblower's hands, etc. entirely free to manipulate the tubular workpiece and the glass article being blown.

If desired, suitable packing, for instance O rings, may be provided in suitable internal recesses in the valve sleeve 22 as indicated at 31.

For purposes of exemplification a particular embodiment of the invention has been shown and described to the best understanding thereof. However, it will be apparent that minor changes and modifications in the arrangement and construction of the parts thereof may be resorted to without departing from the true spirit and scope of the invention as defined in the accompanying claims.

I claim:

1. A closed leakproof chamber having an outlet therein, adapted to be connected to a glassblowing conduit, valve means fixed within said chamber including an axially movable valve member, a bellows member fixed at one end within said chamber, conduit means connected to the interior of said bellows member for introducing and withdrawing pressure from said bellows member connected at its opposite end to said axially movable valve member for moving said axially movable valve member toward a first position upon expansion of said bellows member and toward a second position upon contraction of said bellows member, resilient means within said chamber engaging said axially movable valve member to resiliently urge in said movable valve member to an intermediate neutral position between said first and second positions for venting said chamber to outside air through said valve member, a pressure and suction conduit connected in communication with the interior of said bellows member for introducing pressure into said bellows member to expand said bellows member or withdrawing pressure from said bellows member to contact said bellows member to move said movable valve member between said first and second positions, tubular air venting conduit means extending into said chamber having a venting port controlled by said valve means for venting said chamber to outside air through said movable valve member when said movable valve member is in said intermediate neutral position, tubular low positive pressure conduit means extending into said chamber connected to said valve means for admitting air at predetermined low positive pressure through said movable valve member into said chamber when said bellows member is expanded to move said movable valve member toward said first position, suction conduit means extending into said chamber controlled by said movable valve member for withdrawing air from within said chamber through said movable valve member when said bellows member is contracted to move said movable valve member to said second position.

2. In an apparatus as set forth in claim 1 in which said valve means comprises an elongated tubular fixed valve guide sleeve within the chamber having an air inlet port intermediate its ends connected in communication with said tubular air inlet conduit means, said tubular valve guide sleeve having a pressure inlet port through the wall thereof at one side of the air inlet port spaced axially away from said bellows member in communication with said tubular pressure conduit means for admitting a predetermined low positive pressure medium therethrough, said tubular valve guide sleeve having a suction inlet port through the wall thereof spaced axially from said air inlet port at the opposite side thereof toward said bellows connected in communication with said suction conduit means, said movable valve member comprising an elongated tubular slide valve slidably fitting said tubular valve guide sleeve and fixed to the movable end of said bellows member for axial movement thereby between said first, intermediate, and second positions, said slide valve having a hollow central bore opening outwardly away from said bellows into said chamber at its remote end from said bellows member, said valve member formed with a valve port extending inwardly in communication with said chamber through said bore, disposed to register with said air inlet port when in said intermediate position and movable by movement of said valve member to register with said pressure inlet port when in said first position, and to register with said suction inlet port when in said second position.

3. An oral controlled pressure regulator comprising, a closed leaf-proof chamber having an outlet at one end, adapted to be connected to a glass blowing device, a bellows disposed in the chamber having one end thereof fixed to the other end of the chamber, a tubular slide valve axially movable in said chamber having a closed end fixed to said other end of the bellows with its opposite end open into communication with the interior of the chamber and formed with a valve port through the wall thereof intermediate its opposite ends, a tubular valve guide sleeve fixed in said chamber slidably mounting said tubular slide valve therein for axial movement, said tubular valve guide sleeve having an intermediate venting valve port through the wall thereof for registration with said valve port in said tubular slide valve when said tubular slide valve is in a predetermined initial position in said valve guide sleeve, a venting conduit connected at one end to said intermediate venting port in said tubular valve guide sleeve with the other end thereof open into the exterior of the chamber, said tubular valve guide sleeve having a positive pressure inlet port in the wall thereof disposed in axially spaced relation from said intermediate venting valve port in a direction toward the outlet end of the chamber, a positive pressure supply conduit connected at one end to said positive pressure inlet valve port and extending outwardly to the exterior of said chamber, adapted to have positive pressure supply means connected thereto, said tubular valve guide sleeve having a suction pressure supply port in the wall thereof in axially spaced relation from the intermediate venting port at the opposite side thereof from said positive pressure supply port, a suction pressure supply conduit connected at one end to said suction pressure supply port with the opposite end of said suction pressure supply conduit extending through said chamber to the exterior thereof, and adapted to be connected to a source of suction pressure, spring means interposed between each of the opposite ends of said tubular valve guide sleeve and each of the opposite ends of said tubular slide valve, yieldably positioning said tubular slide valve with the said valve port therein in register with the intermediate venting port in said tubular valve guide sleeve, for venting the interior of said chamber through said tubular slide valve to the exterior of the chamber, a positive and suction pressure introducing conduit extending into said chamber with one end thereof fixed in communication with the interior of said bellows and its other end extending out of the chamber, and adapted to be connected to a source of positive or suction pressure such as a blower's mouth piece to selectively introduce positive pressure or suction pressure by a glassblower into said bellows, to selectively move said tubular slide valve axially to shift the valve port therein into register with said positive pressure inlet port, or shift the slide valve in the opposite direction to move the valve port therein into register with the suction pressure supply port in said tubular valve guide sleeve.

4. In an apparatus, as set forth in claim 3 in which said pressure inlet, venting and suction conduits extend rigidly into said chamber at spaced positions around said bellows to support said valve guide sleeve means substantially concentrically within said chamber, to thereby support said sleeve valve member therein for sliding movement within said chamber between said first, second and neutral intermediate positions by the bellows and the spring means.

5. Apparatus as set forth in claim 4 including means for supplying an inert gas under low pressure to said pressure inlet conduit and a flexible collapsible inert pressure receiver connected in communication with the outlet of said venting conduit having a predetermined pressure relief opening therein.

6. A closed leakproof chamber having an outlet opening through the wall thereof, a low pressure supply conduit extending from the exterior of said chamber through the wall thereof into the interior of the chamber, a venting conduit extending from the exterior of said chamber through the wall thereof into the interior of said chamber, an elongated tubular valve guide sleeve fixed in said chamber having axially spaced positive pressure inlet and chamber venting valve ports through the wall thereof intermediate the opposite ends of said valve guide sleeve connected respectively with said low pressure inlet conduit and said chamber venting conduit for fixedly supporting said valve guide sleeve in said chamber, an elongated tubular slide valve slidably fitting the interior of said tubular valve guide sleeve having a central bore opening outwardly at one end thereof into said chamber, and formed with a valve port opening outwardly through the wall thereof from said central bore, said tubular slide valve movable axially in one direction in said tubular valve guide sleeve to chamber venting position to register said valve port therein with said venting port in said valve guide sleeve, an axially extensible and contractable bellows having one end fixed in said chamber and its opposite end fixed to the end of said tubular slide valve, and expansible for moving said tubular slide valve from said venting position to register the port therein with said low pressure inlet port, and spring means operable between said valve guide sleeve and the bellows connected end of said tubular slide valve for yieldably urging said tubular slide valve toward said venting position to move said valve port therein into register with the said venting port for normally venting the interior of said chamber to the exterior thereof through said venting conduit, conduit means extending into said chamber having one end in communication with the interior of said bellows for selectively introducing positive pressure into said bellows to shift said tubular slide valve from said venting position to register the valve port therein with said low pressure supply port, to admit low pressure into said chamber, and tension said spring means for returning said slide valve to its venting position upon a predetermined, reduction of pressure in said bellows.

References Cited
UNITED STATES PATENTS

| | | | |
|---|---|---|---|
| 172,492 | 1/1876 | Prall | 137—625.66 |
| 900,914 | 10/1908 | Clarke | 65—301 |

DONALL H. SYLVESTER, *Primary Examiner.*

J. H. HARMAN, *Assistant Examiner.*

U.S. Cl. X.R.

65—300, 110, 157, 160; 137—625.48, 625,66, 625.25, 625.42, 625.40